United States Patent [19]

Rossigno et al.

[11] Patent Number: 4,826,121

[45] Date of Patent: May 2, 1989

[54] FASTENER FOR SECURING A SHELL TO A FIREWALL

[75] Inventors: Louis P. Rossigno, Granger; Harold M. Nofzinger, South Bend, both of Ind.

[73] Assignee: Allied Signal Inc., Morristown, N.J.

[21] Appl. No.: 80,727

[22] Filed: Jul. 31, 1987

[51] Int. Cl.$^4$ ............................................. B62D 23/00
[52] U.S. Cl. .................. 248/222.2; 248/27.3; 60/547.1; 92/161
[58] Field of Search ................ 248/27.3, 220.2, 221.3, 248/222.1, 222.2, 223.3, 223.4, 225.1; 60/547.1; 92/161, 146, 128, 169; 403/199, 192

[56] References Cited

U.S. PATENT DOCUMENTS

| | | | |
|---|---|---|---|
| 2,811,328 | 10/1957 | Ericson | 248/27.3 |
| 3,040,535 | 6/1962 | Randol | 60/554 |
| 3,278,145 | 10/1966 | Leshuk | 248/27.3 |
| 3,298,641 | 1/1967 | Puerner | 248/27.3 |
| 3,332,648 | 7/1967 | Selinder | 248/27.3 |
| 3,613,177 | 10/1971 | Davis | 248/27.3 X |
| 3,695,568 | 10/1972 | Hogrebe | 248/222.2 |
| 4,270,353 | 6/1981 | Thomas | 60/581 X |
| 4,307,570 | 12/1981 | Yardley | 60/547.1 |
| 4,455,829 | 6/1984 | Seip | 60/547.1 |
| 4,487,022 | 12/1984 | Kytta | 60/547.1 |
| 4,522,310 | 6/1985 | Mikic | 248/221.3 X |
| 4,586,580 | 5/1986 | Spielmann | 60/547.1 X |
| 4,672,812 | 6/1987 | Carre | 60/547.1 |

Primary Examiner—J. Franklin Foss
Assistant Examiner—Robert A. Olson
Attorney, Agent, or Firm—Leo H. McCormick, Jr.; Ken C. Decker

[57] ABSTRACT

A fastener arrangement for securing a shell (14) of a brake booster (10) to the firewall (12) of a vehicle. An annular radial land (18) on the shell (14) is located adjacent a flange (22) on the firewall (12). A spring clip (26) acts on the land (18) to position a groove (20) between the land (18) and the end wall (16) of the shell (14) around the flange (22). The flange (22) axially retains the land (18) to connect the shell (14) to the firewall (12).

8 Claims, 1 Drawing Sheet

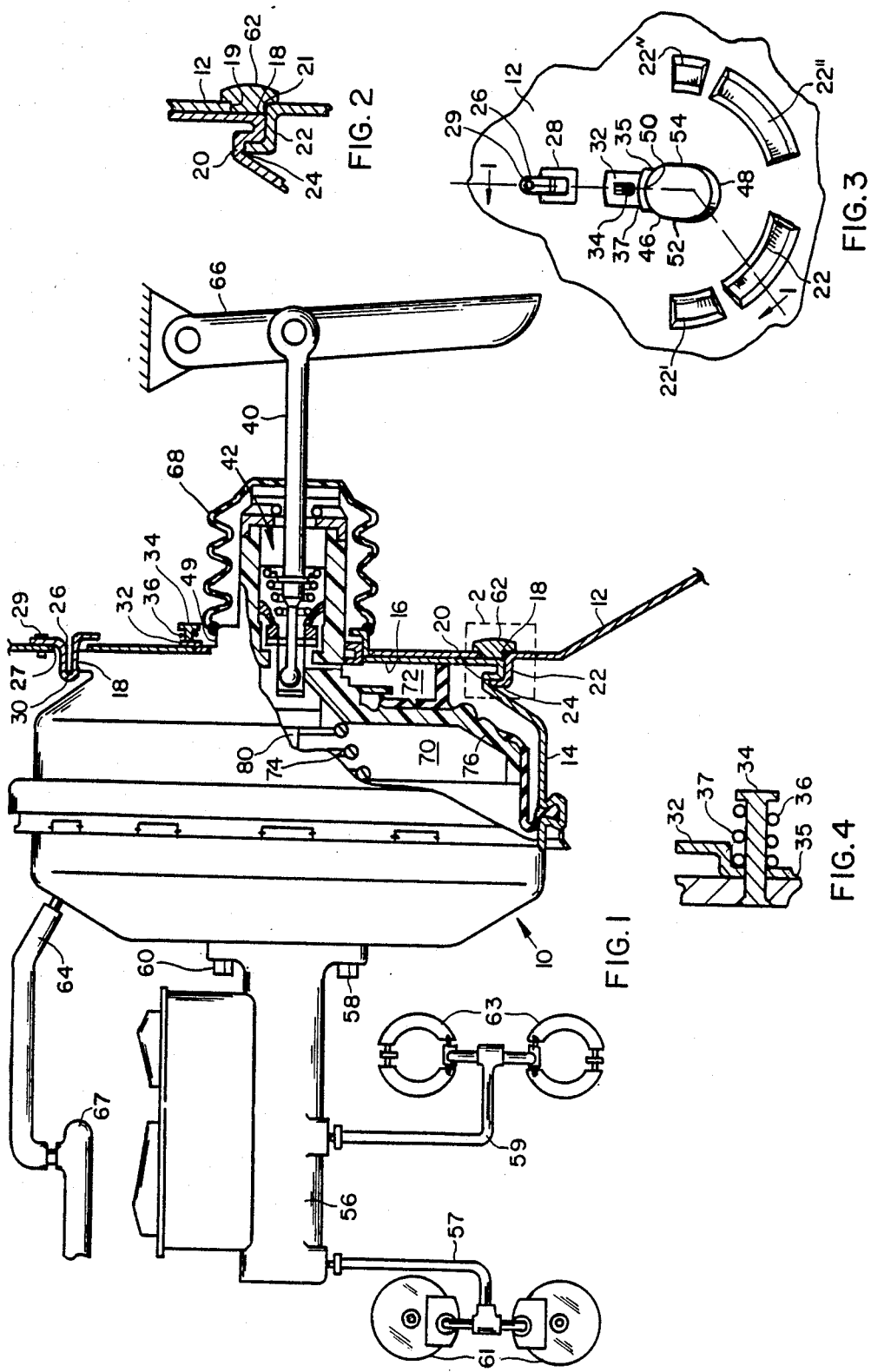

FASTENER FOR SECURING A SHELL TO A FIREWALL

This invention relates to a structure for fastening the shell of a brake booster to a firewall.

The most common manner in which a brake booster is connected to a firewall of a vehicle is through a series of bolts that extend from the rear shell. U.S. Pat. No. 3,040,535 is a typical example of the use of such connection. Often when the bolts are welded to the shell, the temper or strength of the steel in the shell is reduced. After a period of use, the area around a bolt can become distorted from the repeated forces exerted on the resulting connection. Eventually a crack may develop in the weld area which allows air to pass through the shell of the brake booster.

U.S. Pat. No. 4,487,022 discloses a vacuum brake booster wherein the firewall forms the rear shell for the brake booster. However, the front shell is still connected to the firewall through a series of bolts. This type booster is an improvement over prior shells since the reaction forces are more evenly distributed over a larger area and is designed as a result there is less distortion when subjected to the reaction forces generated during a brake application.

In an effort to reduce the distortion in the rear shell that occurs during a brake application, various force transmitting devices have been suggested to carry the force directly from a master cylinder into the firewall. U.S. Pat. No. 4,672,812 discloses the use of a stirup on the outside of the shell which retains the brake booster and carries the master cylinder. Similarly, U.S. Pat. No. 4,270,353 discloses the use of bolts that extend through the vacuum brake booster to carry the reaction forces directly to the firewall.

In all of the prior art the attachment of the bolts to the firewall takes considerable time and effort on the part of a manufacture of the vehicle. In addition to the reductions in the strength of the shell of the master cylinder by the welding of the bolts, alignment and damage to the threads of the bolts can occur before the shell is fixed to the firewall.

SUMMARY OF THE INVENTION

In this invention a fastener arrangement is disclosed which eliminates the need for bolts in order to attach a shell of a brake booster to the firewall of a vehicle. A rib on the shell is located in a flange on the firewall and the flange retained in a groove adjacent to the rib. A spring clip engages the rib to radially hold the shell in the flange and define the connection for the shell to the firewall.

When a reaction force is carried through the shell, the rib transfers the force into the flange to uniformly distribute the forces into the firewall without axial distortion.

It is an object of this invention to provide a fastener for securing a shell of a brake booster to a firewall without the use of bolts.

It is a further object of this invention to provide a method of attaching a shell of a brake booster to a firewall by positioning a land in a flange and radially holding the land against the flange by a spring clip to define the connection.

An advantage of this invention occurs in the attachment of a brake booster to a firewall since an operator can install the booster by sliding the hub through an opening in the firewall until the face on the shell engages the firewall. Thereafter a radial force is applied and a spring clip snaps over the land to hold the booster in a fixed position.

These objects and advantages should be apparent from reading this specification and viewing the drawings wherein:

FIG. 1 is a schematic illustration of a brake system showing a sectional view along line 1—1 of FIG. 3 of the attachment of a brake booster to a firewall in accordance with the present invention;

FIG. 2 is an enlarged view of circumscribed section 2 shown in FIG. 1;

FIG. 3 is a view of the firewall prior to the attachment of the brake booster; and FIG. 4 is a view of a secondary fastener for holding the brake booster in a fixed radial position on the firewall.

DETAILED DESCRIPTION OF THE INVENTION

The brake system herein in FIG. 1 has a vacuum brake booster 10 attached to the firewall 12 of a vehicle through a fastener arrangement without the need for studs.

In the fastener arrangement, the rear shell 14 of the booster 10 has an end plate 16 with an annular land 18 located adjacent a groove 20. The land 18 is located a set radial distance from the axial center of the brake booster 10 and is designed to transfer the reaction forces generated during a brake application into a corresponding flange 22 on the firewall 12 without distortion or deflection in the shell 14. When best seen in FIG. 2, the annular land 18 engages flange 22 as the end 24 of flange 22 is positioned in groove 20.

A spring clip 26 fixed to the firewall 12 by pin 29 extends through an opening 28 and detent 30 snaps over land 18 to provide a spring force that urges land 18 against flange 22.

As seen in FIG. 3, flange 22 in the firewall 12 is broken into a series of flanges or tabs 22, 22'... $22^N$ to provide for greater strength in the distribution of reaction forces transmitted through the flange 22.

Further under some circumstances it may be desirable to provide a secondary member for holding the vacuum brake booster 10 in a substantially fixed position on the firewall 12. As shown in FIGS. 1, 3 and 4 a slide member 32 is fixed to the firewall 12 by a pin 34. A spring 36 acts on the slide to urge the slide member 32 toward the firewall 12.

METHOD OF ATTACHMENT OF THE BRAKE BOOSTER TO THE FIREWALL

The brake booster 10 is preassembled by a manufacturer and shipped to be installed on a vehicle with the push rod 40 attached to the control valve 42.

The firewall 12 of the vehicle is made of metal and stamped to include: flanges 22; 22'... $22^N$, opening 46 which receives the hub 49 on the rear shell 14 and opening 22. Opening 46 has a semi-circular base 48 joined to a semi-circular top portion 50 by parallel side portions 52 and 54.

The brake booster 10 with master cylinder 56 attached thereto by bolts 58 and 60 is aligned with the top portion 50 of opening 46. Push rod 40 and hub 49 pass through the top portion 50 and end plate 16 on booster 10 is brought into engagement with firewall 12. As the booster 10 is moved toward firewall 12, spring clip 28 contracts to allow end plate 16 to engage the firewall 10. Thereafter, a radial force is applied to move land 18 into flange 22 as the end 24 of flange 22 moves into groove 20. When land 18 reaches the base 21, tang or detent 30 on spring clip 28 snaps over land 18 to resiliently urge the booster 10 to a fixed position on the firewall 12.

In installations having a secondary member for holding the booster 10 in the fixed radial position, slide 32 is moved to bring end 35 into contact with hub 49. End 35 has the same configuration as hub 49 and when offset 37 is aligned with the top portion 50 of opening 46, spring 36 moves slide 32 against the firewall 12 to lock the hub 49 in position.

With the brake booster 10 secured to the firewall 12, brake lines 57 and 59 are connected to the front and rear brakes 61 and 63 of the vehicle.

Thereafter, conduit 64 connects the brake booster 10 with the intake manifold 61 of the vehicle to provide a source of vacuum to operate the pressure differential brake booster 10.

Dust boot 68 is placed on push rod 40 and pedal 66 attached thereto. A cover 62 snaps into opening 19 on the firewall 12 to complete the installation.

MODE OF OPERATION OF THE INVENTION

When the vehicle is operating, vacuum is available at the intake manifold 61. This vacuum is communicated to brake booster 10 by conduit 64 which evacuates air from chambers 70 and 72. Return spring 74 holds wall 76 against the end plate 16 in a manner as shown in FIG. 1.

When an operator desires to effect a brake application, an force applied to pedal 66 moves valve 42 to allow air to enter chamber 72 and develop a pressure differential across wall 76 with the vacuum in chamber 70. This pressure differential acts on wall 76 to develop an operational force that is transmitted through push rod 80 to provide the force to operate the master cylinder 56 and supply brakes 61 and 63 with pressurized fluid to effect a brake application.

The resistance to the development of the operational force in the master cylinder is transmitted into the firewall 12 through land 18 and flange 22. We have determined that even though flange 22, 22'. . . . 22$^N$ does not completely engage the entire land 18, as long as at least the length of the flange is about equal to a semi-circle there is sufficient surface area to transfer the reaction force into the firewall 12 without distortion or deflection.

We claim:

1. In a brake system having a brake booster and a firewall of a vehicle, the improvement in the fastener arrangement for attaching said brake booster to said firewall comprising:

a shell of said brake booster having an end member with an annular radial land located adjacent a groove in a sidewall;

a flange extending from said firewall, said flange having a series of tabs that form an arc around an opening in said firewall, said opening having a semi-circular base connected by a slot to a semi-circular top;

a hub section extending from said shell and located in said opening in said firewall;

a clip member attached to said firewall and engaging said land on said shell to urge said hub from said semi-circular top toward said semi-circular base when said flange is located in said groove;

a slide member attached to said firewall and having an offset portion; and a spring for urging said offset portion into engagement with said firewall on engagement of the end thereof with the hub, said offset portion engaging said hub to position said hub against said semi-circular base to thereafter prevent radial movement of said hub in said opening.

2. The fastener arrangement as recited in claim 1 further including:

said spring for urging said offset portion comprising a leaf spring member having a first end fixed to said firewall and a second end free to flex as the hub section on the shell axially moves through said opening, said leaf spring retracting as the land moves into engagement with the flange, said second end engaging said hub on retraction to prevent said brake booster from thereafter radially moving with respect to said opening.

3. The fastener arrangement as recited in claim 1 wherein said clip member includes:

a detent which engages said land to hold the shell against the firewall.

4. The fastener arrangement as recited in claim 3 wherein said fastener arrangement further includes:

a cover member attached to said firewall and located adjacent said flange to reduce the transmittance of sound through said firewall.

5. A fastener arrangement as recited in claim 1 wherein said firewall is substantially one continuous member located in the same radial plane and any reaction forces transmitted through said shell are transmitted through said flange without deflecting the firewall from the radial plane.

6. In a brake system wherein a shell of a brake booster is attached to the firewall of a vehicle, the improvement in the attachment structure comprising:

an end member of said shell having a hub extending therefrom, said end member having an annular radial land on its periphery, said shell having an annular side wall connected to said end member, said side wall having a groove located adjacent said radial land;

a flange extending from said firewall and surrounding a portion of an opening in said firewall, said opening having a semi-circular base connected by a slot to a semi-circular top, said hub being located in said opening; and a leaf spring member having a first end fixed to said firewall and a second end that engages said radial land to urge said flange into said groove and said hub from said semi-circular top toward said semi-circular base to prevent said brake booster from moving axially and radially with respect to said firewall.

7. In the brake system as recited in claim 6, further including:

a slide member secured to said firewall having an offset portion that engages said hub to hold the hub against said semi-circular base and thereby prevent radial movement in said opening when said flange is located in said groove.

8. In the brake system as recited in claim 7 further including:

a detent on said leaf spring that engages said land to hold the end member against said firewall.

* * * * *